July 4, 1933.  H. A. WADMAN  1,917,199
AUTOMATIC CHARGE GUIDE ADJUSTING MECHANISM FOR GLASS FEEDING APPARATUS
Filed July 30, 1932  2 Sheets-Sheet 1
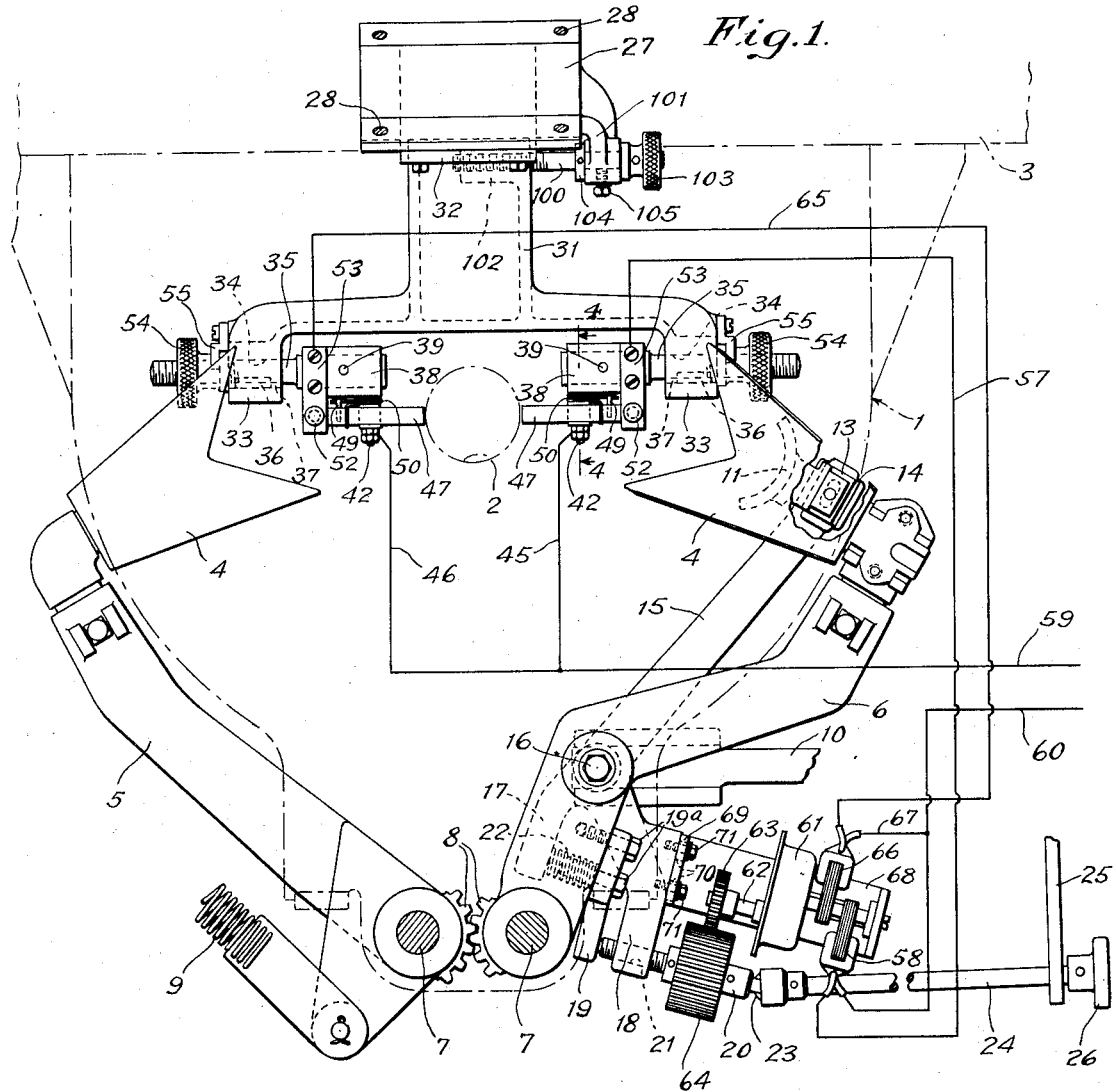
Inventor
Harold A. Wadman
by Brown & Parham
Attorneys.
Witness:
A. A. Horn

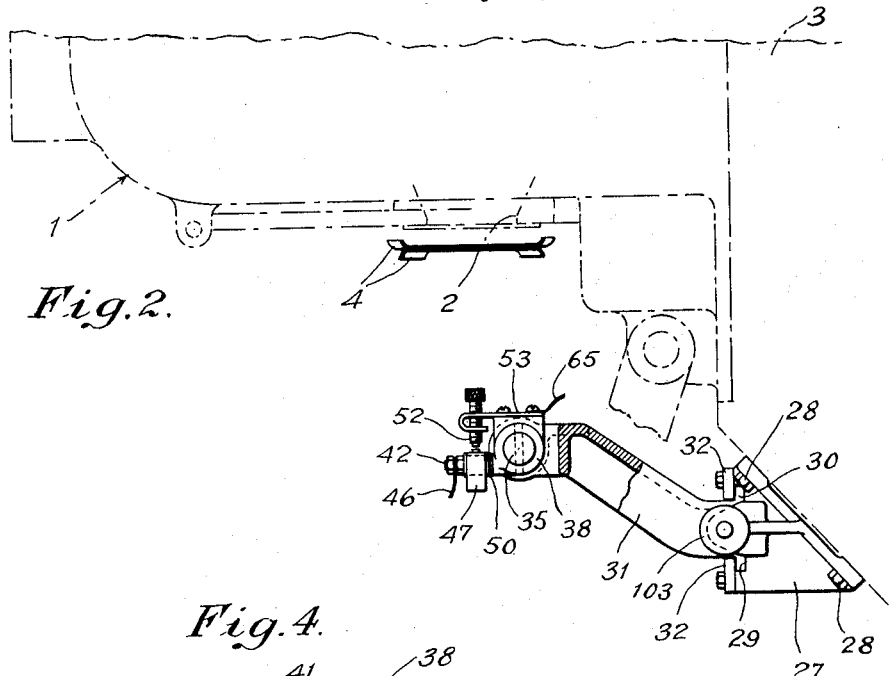
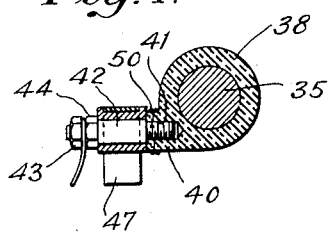
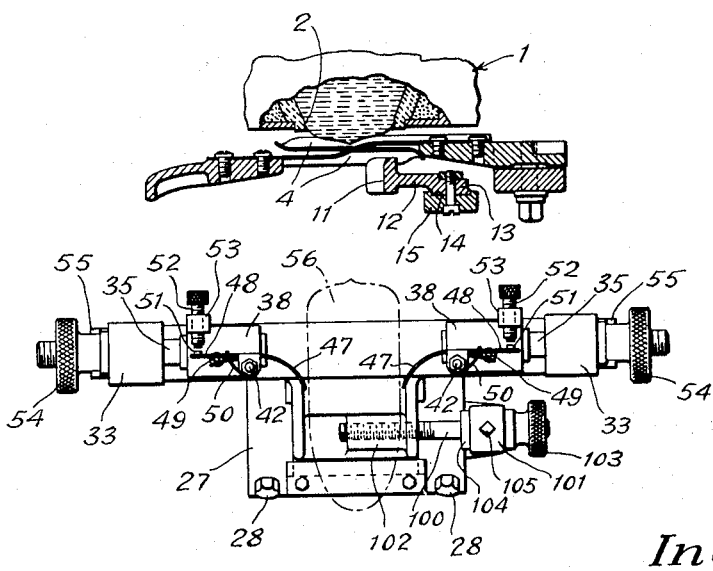

Patented July 4, 1933

1,917,199

UNITED STATES PATENT OFFICE

HAROLD A. WADMAN, OF WEST HARTFORD, CONNECTICUT, ASSIGNOR TO HARTFORD-EMPIRE COMPANY, OF HARTFORD, CONNECTICUT, A CORPORATION OF DELAWARE

AUTOMATIC CHARGE GUIDE ADJUSTING MECHANISM FOR GLASS FEEDING APPARATUS

Application filed July 30, 1932. Serial No. 626,352.

This invention relates generally to the delivery of mold charges of molten glass which have been produced in suspension by glass feeding apparatus and have been severed while in suspension below the outlet of the glass feeder.

Modern glass feeders for feeding molten glass in "suspended" charges ordinarily effect the severance of such charges by the use of cooperative shear blades which are periodically closed to cut through the suspended charge masses and which, when closed, are in overlapping relation. Such shear blades, in closing, usually approach the suspended charge mass of molten glass from the opposite sides thereof.

It is recognized in the art that the lower shear blade of a severing mechanism of the character above referred to tends to deflect or "bat" the upper portion of the mold charge laterally from the vertical at the time of the severance of such charge. The lateral deflection, tilting, or displacement of the mold charge or of the upper end portion thereof, as a result of this action of the lower shear blade, if not prevented, may cause the severed charge to be delivered improperly or imperfectly to a mold, delivery chute, or other charge receiver. Such improper or imperfect delivery of the severed charges may cause defects in the glassware made therefrom.

It has been proposed prior to the present invention to obviate or overcome lateral deflection, tilting, or displacement of the upper end portions of the severed charges by providing a charge guide in position to oppose the lateral "batting" action of the lower shear blade. Guides of this character have been mounted for movement with the upper shear blade of a pair of cooperative shear blades. It also has been proposed to mount a guide of this character on mechanism independent of the shear mechanism.

In the use of a guide for preventing lateral deflection, tilting, or displacement of the upper end portion of the mold charge by the shear blades, it is desirable that the glass contacting surface of such guide should be disposed in position to contact with the lateral surface of the upper end portion of the charge at and immediately subsequent to the severance of the charge, so as to steady and guide the charge downward in a straight vertical path to an underlying charge receiver. The contact of such guide with the glass charge should not be sufficient to mark the charge or to cause a deflection or tilting of the charge or of a portion thereof in the opposite direction.

Prior to the present invention, charge guides have been mounted so that they may be adjusted with respect to the extended axial line of the outlet with a view to disposing such guides in the best position at the time of the severance of the charges to be guided. However, all of such adjustments of which the applicant is aware have been manual in character and have been subject to the judgment and efficiency of the attendants or operators of the glass feeding apparatus. The tendency of the shear blades to deflect or "bat" the mold charge or the upper end portion thereof laterally and/or the effect of such tendency may be changed during the operation of the glass feeding apparatus. A change of this character may require a change of position of the charge guide for the most beneficial results or to preclude improper delivery of the charges to the associate charge receivers. Manually adjustable guides therefore may not provide adequately for uniformity of delivery of the mold charges for a period of time of any substantial duration.

The changes which make necessary or desirable a change of position of the charge guide may take place slowly and by increments and may not be noticed by the operator or attendant until a considerable number of mold charges have been improperly or imperfectly delivered to the associate charge receivers. Thus, a change of temperature of the glass fed through the outlet for the production of the mold charges may be attended by a change of viscosity of the glass. The change of viscosity may cause a change in the resistance of the glass to the "batting" action of the shear blades, and also may cause a change in the effect of the "batting" action of the shear blades because of a change of length and/or size of the charges produced. The effect of the "batting" action of the shear blades on a longer and narrower charge is different from that on a shorter and thicker charge. Any change in the frequency of the severing operations or in the timing thereof or in operating conditions in the feeding forehearth may make necessary or desirable a change of position of the charge guide. A differential lubrication of the shear blades so that one will cut through the glass more easily than the other, or any differential action of the shear blades in cutting through the mold charge mass may cause a deflection of the upper end portions of the severed charges which should be obviated by an adjustment of the guide.

An object of the present invention is to improve mold charge guiding mechanism for glass feeding apparatus so as to provide for adjustment of the charge guide automatically from an approximate operative position to the best position for the performance of the charge steadying and guiding function for which the guide is intended.

A further object of the invention is to provide means for adjusting the operative position of a mold charge guide of the character above described automatically in response to lateral deflection, tilting, or displacement of a previously produced mold charge.

A further object of the invention is to provide improved means for steadying and guiding mold charges that are severed in suspension, so as to insure delivery of the severed charges uniformly to a definite and exact position.

The invention provides means for detecting and responding to lateral deflection of the upper end portion of a severed mold charge so as to actuate associate mechanism for effecting an adjustment of the associate guide as required to prevent lateral deflection, tilting, or displacement of subsequently severed mold charges. The means for detecting or indicating the lateral deflection of the mold charges may vary considerably in character and in operation. Also, the particular construction and mode of operation of the mechanism by which the guide may be adjusted under control of the deflection-detecting means, as just described, may vary considerably without departing from the invention. Such adjusting means may be of a character suitable for adjustment of a guide that is mounted to move with the upper shear blade or is mounted independently of the shear mechanism.

These and other features of the invention will be understood from the following description and from the accompanying drawings of a practical embodiment of the invention, in which—

Figure 1 is a plan view of glass feeding apparatus equipped with automatic mechanism of the invention for adjusting the charge guide, the forehearth of the feeding apparatus being shown diagrammatically and in dot-and-dash lines and many of the ordinary parts of the feeding apparatus being omitted for clearness;

Fig. 2 is a side elevation of a portion of the automatic charge guide adjusting mechanism of the present invention as applied to glass feeding apparatus, the forehearth of the glass feeding apparatus being shown diagrammatically in dot-and-dash lines and parts of the structure of the view being shown in vertical section;

Fig. 3 is a fragmentary view in elevation substantially at right angles to Fig. 2, showing the shear blades in glass cutting position with the charge guide in operative position below the upper shear blade, and showing improved means of the invention for detecting lateral deflection or tilting of the upper end portion of a falling severed charge; and Fig. 4 is a relatively enlarged sectional view of mechanism for supporting one of the deflection-detecting members of the invention.

Referring now to the drawings, a glass feeding forehearth, designated 1, is provided with a bottom discharge outlet 2 and may receive glass from an associate furnace 3 or other suitable source of supply of molten glass. The outlet 2 will be submerged by glass of the supply within the forehearth. The discharge of glass from the outlet 2 and the formation of successive suspended mold charge masses of glass below the outlet may be controlled in any suitable known manner.

The forehearth may be of any suitable construction, such for example as that shown in Patent No. 1,760,254, granted May 27, 1930 to Karl E. Peiler, for apparatus for feeding molten glass, known in the art as the Hartford-Empire Single Feeder.

Shear blades 4 may be closed periodically to sever mold charges from the successive suspended mold charge masses below and at a plane spaced from that of the lower end of the discharge outlet. These shear blades are shown as being supported on shear arms 5 and 6, respectively, the shear arm 6 being that on which the upper shear blade is carried.

The shear arms 5 and 6 are mounted to swing about the axes of vertical pivot elements 7. Suitable mechanism, such as that comprising enmeshed segmental gears 8, is provided for causing simultaneous swinging movements of the shear arms in opposite directions when one of such shear arms has been actuated so as to swing about the axis of its pivotal support. A spring 9 may be connected with one of the shear arms, as to the shear arm 5, so as to tend to swing the shear arms as required to effect closing of the shear blades. An operating member 10 is connected with the other shear arm and is adapted to be actuated to swing the shear arms as required to move the shear blades periodically to open position, as shown in Fig. 1, and to permit closing of the shear blades periodically.

The particular means for actuating the member 10 is not shown in the drawings, but the shearing mechanism, as a whole, may be substantially the same as that which is disclosed in detail in the aforesaid Peiler Patent 1,760,254, or may be of any other suitable known construction.

A charge guide 11 is shown in Figs. 1 and 3, and is mounted for movement with the upper shear blade. This charge guide preferably is formed to be arcuate in horizontal sectional configuration, as shown by the dotted lines in Fig. 1, so that the glass contacting face thereof will conform substantially in configuration to the lateral surface of each of the glass charges which are to be steadied and guided by the guide.

The guide 11 has a substantially horizontal shank 12, the outer end portion of which is formed as a block 13, Fig. 3. This block fits slidably in a longitudinally extending groove 14 in the upper surface of the free end portion of a lever 15. The lever 15 is fulcrumed on a vertical pivot element 16, which may be the depending lower end portion of the pivot element by which the actuating member 10 is connected with the shear arm 6.

The guide carrying lever 15 is supported by the shear arm 6 so that it may move with the latter and also may be adjusted about the axis of the pivot element 16 to vary the position of the guide 11 with respect to the cutting edge of the associate shear blade 4.

The rearward end portion of the lever 15 is bifurcated and comprises the branches 17 and 18, Fig. 1. The branch 18 has its outer end portion disposed in confronting relation to an abutment plate 19. The latter is secured, as by the cap bolts 19a, to the inner or pivoted end portion of the shear arm 6. A threaded end portion of a secton 20 of an adjusting rod is threaded through a transverse opening 21 in the outer end portion of the branch 18 of the shorter end portion of the guide carrying lever 15 and bears against the plate 19. The plate 19 is located approximately midway between the branches 17 and 18 of the rearward end portion of the lever 6.

An expansion spring 22 bears at one end against a portion of the plate 19, and at its other end against the branch 17 of said lever, and thus tends to maintain the end of the section 20 of the adjusting rod against the plate 19, as clearly shown in Fig. 1. This expansion spring 22 may be retained in place by a projection extending from the plate 19 and encircled by a portion of the spring.

The section 20 of the adjusting rod is connected by a universal joint, indicated at 23, with a relatively long section 24 of said adjusting rod. The section 24 extends slidably and loosely through an opening in a plate 25, and is provided at its outer end with a hand wheel 26. With this arrangement, the adjusting rod 20—23—24 may be conveniently turned to adjust the length of the portion of the section 20 between the lever branch 18 and the plate 19. Such turning of the adjusting rod will effect angular or swinging movement of the lever 15 about its fulcrum with respect to the shear arm 6, and thus will adjust the distance between the charge guiding or glass contacting face of the guide 11 and the extended axial or center line of the outlet 2 when the shear blades are in their glass severing position, as shown in Figs. 2 and 3.

The connection of the adjusting rod with the shear arm is in proximity to the axis of the pivotal support for the shear arm 6. Consequently the swinging movements of the latter will be attended by but relatively slight movement of the adjusting rod and of the handle by which such adjusting rod may be manipulated. Adjustment of the guide, therefore, may be made conveniently during the continued operation of the shear mechanism and of the associate feeder.

The construction that has been described so far for mounting the guide so that it may move with the upper of a pair of pivotally mounted shear blades, and so that such guide may be adjusted conveniently during the operation of the shear mechanism is included in an embodiment of an invention of William T. Barker, Jr., whose application, Ser. No. 569,450, filed October 17, 1931, for Mold charge guiding means for glass feeding apparatus, owned by the owner of the present invention, discloses and claims such invention. The subject matter of the present invention is an improvement over that disclosed in the aforesaid Barker application, and adds to the feature of manual adjustment, when desired, the feature of automatic adjustment of the guide to carry out the hereinbefore stated objects of the present invention.

Mechanism embodying features of improvement of the present invention as applied to structure such as has been described so far will now be pointed out.

A bracket 27, Fig. 2, may be secured to any convenient support in any suitable known manner, as by fastening devices 28. Such support may be a portion of the framework for the forehearth or of the associate furnace. The bracket 27 has a horizontal slideway 29 in its outer face. The flanged inner end portion 30 of a horizontally adjustable bracket 31 is mounted in this slideway so that it may be adjusted along the latter and is retained therein by retaining members 32 at the top and bottom, respectively, of the slideway.

An adjusting screw 100 is journaled in a transverse opening in a forwardly projecting arm 101 on one end portion of the bracket 27 and has a threaded end portion engaged with the threaded wall of a transverse opening through a boss 102 on the base of the bracket 31. A hand wheel 103 is secured to the outer end portion of the rod 100. A collar 104 is secured to the rod 100 at the opposite side of the arm 101. The hand wheel 103 and the collar 104 cooperate with the arm 101 to prevent longitudinal movement of the rod 100 when the latter is turned about its axis. The hand wheel 103 may be manipulated to turn the rod 100 so as to shift the bracket 31 along the slideway 29. A set screw 105 may be tightened against the rod 100 to prevent accidental turning movement of the latter and to maintain the bracket 31 against unintended movement from an adjusted position along the slideway 29.

The bracket 31 has its outer end portion formed to provide a pair of spaced parallel projecting arms 33. These arms 33 have aligned transverse openings 34 through which adjusting rods 35 extend. Splines 36 carried by these adjusting rods extend into longitudinal grooves or ways 37 in the wall of the openings 34 so as to prevent rotation of the members 35 while permitting longitudinal or axial sliding movements of such members. The inner end portions of the members 35 are provided with sleeves 38, secured thereto, as by the pins 39, Fig. 1.

As shown in Fig. 4, the sleeves 38 are made of electrical insulating material and are provided at their outer sides with parallel bosses 40. Each of these bosses 40 is provided with a threaded socket 41 in which is secured the threaded end portion of a pivot element 42. The pivot element 42 is made of electrical conducting material, and the outer end portion thereof constitutes a terminal post on which an electrical conducting wire may be secured by the nuts 43 and 44. The wire secured on the outer end portion of the right-hand member 42, as viewed in Fig. 1, is designated 45, while the wire that is attached to the outer end of the other member 42 is designated 46. The intermediate portions of the members 42 pivotally support the deflection determining or detecting control fingers or feelers 47. These fingers 47 are disposed at opposite sides of the extended axial line of the outlet, and are spaced apart sufficiently to be located at opposite sides of each mold charge mass that accumulates in suspension from such outlet and preferably, although not necessarily, below the level of the lower end of the pendant mass.

The members 47 preferably are made of a light-weight somewhat resilient material having good heat resisting qualities. As shown in Fig. 3, the members 47 are curved in a generally inward and downward direction so that their lower end portions will be inclined but slightly from the vertical. A falling charge having a laterally displaced upper end portion or a charge that has been tilted by the shear blades thus may actuate a member 47 by contact therewith with a minimum of heating of the member 47 and of chilling or marking the charge.

The members 47 have tail pieces 48 which are urged against stop pins 49 by the action of torsion springs 50 so as to maintain the members 47 substantially in their adjusted positions, such as those shown in Fig. 3. The tail pieces 48 for the members 47 have good electrical conducting qualities. Each is provided adjacent to its extremity with an upstanding contact element 51 adapted to be moved upwardly against a stationary but vertically adjustable contact element 52 when that member 47 has been swung angularly about the axis of its pivotal support against the action of the associate torsion spring 50. The contact elements 52 are shown as screws which are threaded through vertical openings in terminal plates 53 on the collars 38.

The outer end portions of the members 35 are provided with adjusting nuts 54 which may be manipulated to adjust the free ends of the feelers or detectors 47 toward or away from the extended axial line of the outlet. Such adjustment of either member 47 may be effected independently of adjustment of the other member 47. The nuts 54 are retained against axial movement along the rods 35, as by flanges 55 which prevent movement of the adjusting nuts 54 relatively to the collars 38.

The independent adjustment of the respective members 47 is in addition to the adjustment of these members in the same direction and to the same extent as the bracket 31 is shifted along the slideway 29 in the manner hereinbefore described. Preferably, the members 47 are adjusted so that falling glass charges, an example of which is indicated at 56 in Fig. 3, will drop between the adjacent ends of the members 47 without contacting with either if such charges are being properly delivered and are truly vertical throughout their length.

That is, when the guide 11 is in the proper position to steady and guide a charge that has been severed by the closing of the shear blades 4, the separated charge will fall vertically between the adjacent ends of the members 47 without touching either. However, should the guide 11 be disposed too far away from the axial line of the discharge outlet, so that the upper end portion of the severed charge has been deflected or tilted laterally to the right, as viewed in Fig. 3, such deflected upper end portion of the charge will, in falling, strike the right-hand member 47. The consequent turning movement of the latter in a counterclockwise direction about the axis of its pivotal support will close a circuit by moving the right-hand contact 51 upwardly against the associate contact 52.

The right-hand contact 52 is connected through its plate 53 with a wire 57 leading to one side of a motor 58. The wire 45, hereinbefore referred to as connected with the right-hand contact-carrying member 48, is connected with a lead wire or main 59, with which the wire 46 also is connected. The other side of the motor 58 is connected with a lead wire or main 60. Thus, when the right-hand contacts 51 and 52 are engaged, a circuit for operating the motor 58 will be closed. This motor will act through a speed reduction unit 61 to impart a rotary movement to driven shaft 62. The shaft 62 carries a gear 63 normally in mesh with a gear 64 on the section 20 of the hereinbefore referred to rod for adjusting the position of the charge guide 11.

Consequently, the contact of the glass with the right-hand member 47 and the closing of the circuit for operating the motor 58 will cause a turning of the adjusting rod in the direction required to effect adjustment of the guide 11 toward the extended axial line of the outlet. The adjusting movement of the guide 11 by each operation of the motor 58 may be slight. As mold charges are severed with relatively great frequency, which may be at the rate of as many as 70 or even more per minute, the motor 58 will be actuated repeatedly, if required, until the guide 11 has been adjusted toward the axial line of the outlet a sufficient distance to dispose the guide in position to steady and guide the severed charges properly.

Should the position of the guide be too near the axial line of the outlet so that the charges are deflected in the opposite direction, the falling charges then will strike the left-hand member 47, as viewed in Figs. 1 and 3, and will move the contact at the outer end of the latter against the associate contact 52. A wire 65, leading to one side of a motor 66, is connected with the left-hand contact element 52. The other side of the motor 66 is connected by a wire 67 with the lead wire or main 60. Since the wire 46 is connected with the main 59, a circuit for operating the motor 66 will thus be closed. The motor 66 is connected through the reduction unit 61 to drive the shaft 62 in a direction which is the reverse of that in which such shaft is driven by the motor 58. The consequent adjustment of the guide 11 will be away from the extended axial line of the glass discharge outlet. The motors 58 and 66 and the speed reduction unit 61 are not shown in detail, nor need they be so described, because examples thereof are well known in the art and may be purchased as assembled apparatus from various sources of supply.

Since the meshing of the gears 63 and 64 and the connection of the former with the speed reduction unit would render manual adjustment of the adjusting rod difficult, if not impossible, provision is made for disengaging the gears 63 and 64 when manual adjustment of the guide is to be effected. To this end, the supporting member, designated 68, for the motors 58 and 66, the speed reduction unit 61, the driven shaft 62, and the gear 63 on said shaft, may be moved bodily as a unit until the gear 63 has been disengaged from the gear 64. As shown, the supporting member 68 has an upturned flange 69, provided with horizontally elongated openings 70, through which pass the shanks of cap bolts 71 by which the supporting member 68 is attached to the branch 18 of the guide carrying lever 15.

It is to be understood that the invention, in its broader aspects, is not limited to the details of construction shown in the accompanying drawings and hereinbefore described, or to the operation thereof. The invention comprehends any means, whether actuated by contact of glass charges therewith or otherwise, for detecting or determining that freely falling charges produced by a feeder are not being delivered properly or perfectly to the exact spot desired and for automatically adjusting the position of an associate charge guide as required to provide for proper or more perfect delivery of charges which are subsequently produced by the feeder.

I claim:

1. In glass feeding apparatus, the combination with means for severing mold charges from successive suspended mold charge masses of molten glass, of an adjustable guide for directing the severed charges to a definite delivery point, and means responsive to abnormality in the delivery of charges to said point for automatically adjusting said guide to position to effect normal delivery of succeeding charges.

2. In glass feeding apparatus, a glass severing blade movable transversely through a suspended mold charge mass to sever a mold charge therefrom, an adjustable guide at the side of the axial line of the suspended mold charge mass substantially opposite to the shear blade for opposing the tendency of the shear blade to "bat" the upper portion of the severed charge laterally at the time of its severance, and means acting automatically in response to lateral deflection of a portion of a preceding charge by said shear blade to adjust the position of said guide to obviate "batting" of succeeding charges.

3. In glass feeding apparatus, the combination with a pair of pivotally mounted shear blades for severing mold charges periodically from successive suspended mold charge masses of glass, an adjustable guide for opposing the tendency of the shear blades to "bat" glass of each of the severed charges laterally at the time of severance thereof, means for detecting lateral deflection of the mold charges by the shear blades, and means responsive to said deflection-detecting means to adjust said guide in accordance with the deflection of preceding charges to obviate like deflection of succeeding charges.

4. In glass feeding apparatus, a pair of pivotally mounted shear blades for severing mold charges periodically from successive suspended mold charge masses, a guide adjustable relatively to the axial line of said suspended mold charge masses for opposing the tendency of the shear blades to deflect the upper end portion of each severed charge laterally at the time of severance of said charge, means for detecting the presence or absence of lateral deflection of each severed charge, and means controlled by said deflection-detecting means for automatically adjusting the guide relatively to the axial line of the suspended mold charge masses in the direction and to the extent required to obviate in subsequently severed charges a deflection detected in a prior severed charge.

5. In glass feeding apparatus, a pair of pivotally mounted shear blades for severing mold charges periodically from successive suspended mold charge masses, an adjustable guide for opposing the "batting" action of the shears on the charges severed thereby, means normally out of contact with the severed charges for detecting lateral deflection of the upper end portion of a severed charge in either of opposite directions, and means responsive to said detecting means for adjusting said guide toward or away from the axial line of the suspended mold charge masses according to the direction of deflection from said axial line of a preceding severed charge.

6. In glass feeding apparatus, the combination with a pair of pivotally mounted shear blades for severing mold charges periodically from successive suspended mold charge masses of glass, an adjustable guide for opposing the "batting" action of the shear blades on the upper end portion of each of the severed charges, a pair of deflection-detecting elements located at opposite sides of the path of fall of each severed charge, said elements being spaced apart to permit each undeflected properly delivered charge to fall between these elements without contact therewith and to cause actuation of one or the other of said elements when a charge having a laterally deflected portion falls between the elements, and means operable by either of said deflection-detecting elements when the latter has been actuated by a falling charge to adjust said guide so as to obviate in a succeeding charge a lateral deflection such as indicated by the actuation of said deflection-detecting element.

7. In glass feeding apparatus, a pair of pivotally mounted shear blades for periodically severing mold charges from successive suspended mold charge masses of glass, an adjustable guide for opposing the "batting" action of the shear blades on the upper end portion of each severed charge, a pivoted deflection-detecting finger having its free end adjacent to the path of downward movement of each severed charge to a desired point of delivery, said finger being adapted to be untouched by a downwardly falling properly delivered undeflected charge and to be swung outwardly about the axis of its pivot by the contact therewith of glass of an improperly delivered laterally deflected charge, and means operable in response to actuation of said finger to adjust the guide to position to prevent a like lateral deflection of the upper end portion of the succeeding severed charge.

8. In glass feeding apparatus, a pair of pivotally mounted shear blades for periodically severing mold charges from successive suspended mold charge masses of glass, an adjustable guide for opposing the "batting" action of the shear blades on the upper end portion of each severed charge, a pivoted deflection-detecting finger having its free end adjacent to the path of downward movement of each severed charge to a desired point of delivery, said finger being adapted to be actuated by contact of glass of the falling charge therewith should a portion of said charge have been deflected by the shears laterally toward said finger, an electric circuit adapted to be closed by the actuation of said finger by a falling charge, and means operated by the closed electric circuit to adjust said guide to position to prevent a like deflection of glass of the succeeding severed charge.

9. In glass feeding apparatus, a pair of pivotally mounted shear blades for periodically severing mold charges from successive suspended mold charge masses of glass, an adjustable guide for opposing the "batting" action of the shear blades on the upper end portion of each severed charge, a pivoted deflection-detecting finger having its free end adjacent to the path of downward movement of each freely falling severed charge, said finger being adapted to be actuated by the contact therewith of glass of the falling charge should a portion of said charge have been deflected laterally toward said finger, means operable in response to actuation of said finger by said falling charge to adjust the guide to position to prevent a like lateral deflection of a subsequently severed charge, and means for adjusting said deflection-detecting finger with respect to the path of movement of the falling charges.

10. In glass feeding apparatus, a pair of pivotally mounted shear blades for severing mold charges periodically from successive suspended masses of molten glass, an adjustable guide for opposing the "batting" action of the shear blades on each severed charge, a pair of pivotally mounted deflection-detecting fingers located at opposite sides of the path of movement of the falling severed charges, means for adjusting said fingers simultaneously with respect to the path of movement of the falling charges, means for independently adjusting said fingers with respect to said path of movement of the falling charges, and means acting automatically in response to actuation of either of said fingers by a laterally deflected or tilted portion of a falling charge to adjust the position of said adjustable guide to obviate a similar deflection in subsequently produced and severed mold charges.

11. In glass feeding apparatus, means for feeding molten glass in a suspended mold charge mass, a pivotally mounted shear blade for severing the charge from the suspended mold charge mass, an adjustable guide for steadying and guiding the charge at and immediately after its severance, manually operable means for adjusting the guide toward and from the axis of a succeeding suspended mold charge mass, means for detecting lateral deflection of the upper end portion of the severed charge, means controlled by said deflection-detecting means for automatically adjusting the position of the guide on detection of deflection of glass of the severed charge so as to obviate like deflection of glass of a subsequently severed charge.

12. In glass feeding apparatus, a container for molten glass having an outlet from which glass is fed in successive descending suspended mold charge masses, a pair of pivotally mounted shear blades for severing charges periodically from said suspended mold charge masses, a charge guide for opposing the "batting" action by the shears on the upper end portion of each severed charge, adjustable means for mounting the guide so that it will move with one of the pivotally mounted blades, adjusting means for the guide, including a manually operable member connected with the guide mounting means near the pivot of the shear blade with which said guide moves, whereby said manually operable member will have but slight movement as compared with the movement of the guide, means for determining the presence or absence of lateral deflection of the upper end portion of each severed charge, a normally open electric circuit arranged to be closed by said last-named means on determination by the latter of deflection of glass of a severed falling charge, and means controlled by said circuit for actuating said adjusting means when the circuit has been closed to adjust said guide as required to obviate deflection of glass of subsequently severed charges.

13. In glass feeding apparatus, the combination with means for severing mold charges periodically from successive suspended mold charge masses of molten glass, an adjustable guide for steadying and guiding each severed charge, manually operable means for adjusting said guide to a position approximating that desired, and means inactive when the severed charges are properly steadied and guided by said guide and rendered active by improper functioning of the guide to adjust the guide automatically to position to function properly.

Signed at Hartford, Connecticut, this 28th day of July 1932.

HAROLD A. WADMAN.